US011875591B2

(12) United States Patent
Lee et al.

(10) Patent No.: US 11,875,591 B2
(45) Date of Patent: Jan. 16, 2024

(54) LIGHT GUIDING MEMBER AND FINGERPRINT IDENTIFICATION MODULE HAVING THE SAME

(71) Applicant: MIYABI TECHNOLOGY CO., LTD., New Taipei (TW)

(72) Inventors: Hsien-Ming Lee, New Taipei (TW); Tsung-Yi Lu, New Taipei (TW)

(73) Assignee: MIYABI TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 17/884,160

(22) Filed: Aug. 9, 2022

(65) Prior Publication Data

US 2023/0245489 A1  Aug. 3, 2023

Related U.S. Application Data

(60) Provisional application No. 63/304,435, filed on Jan. 28, 2022.

(51) Int. Cl.
*G06V 40/12* (2022.01)
*G02B 6/42* (2006.01)

(52) U.S. Cl.
CPC .............. *G06V 40/12* (2022.01); *G02B 6/42* (2013.01); *G02B 6/4281* (2013.01)

(58) Field of Classification Search
CPC .... G06V 40/12; G06V 40/67; G06V 40/1306; G02B 6/42; G02B 6/4281; G09F 13/0404
See application file for complete search history.

(56) References Cited

U.S. PATENT DOCUMENTS

2021/0124890 A1   4/2021   Hai

FOREIGN PATENT DOCUMENTS

| CN | 111582028 A | 8/2020 |
| CN | 213211044 U | 5/2021 |
| TW | 202010140 A | 3/2020 |
| TW | M632311 U | 9/2022 |

OTHER PUBLICATIONS

Taiwanese Search Report dated Nov. 28, 2022 for Application No. 111119716 with an English translation.

*Primary Examiner* — Abhishek Sarma
(74) *Attorney, Agent, or Firm* — Birch, Stewart, Kolasch & Birch, LLP

(57) ABSTRACT

A fingerprint identification module includes a light guiding member, a flexible circuit board, two light emitting members, and a fingerprint identification chip. The light guiding member includes a bottom and a protruding edge. The protruding edge surrounds to form a first space. A first through-hole is formed on the bottom. The flexible circuit board is disposed in the first space and has a first portion, a second portion, a third portion, and a fourth portion connected in sequence. The first portion goes out of the light guiding member through the first through-hole. The third portion faces a direction opposite to the bottom. The second portion and the fourth portion face the bottom of the light guiding member. The light emitting members are disposed on the flexible circuit board and face the light guiding member. The fingerprint identification chip is disposed on the third portion of the flexible circuit board.

21 Claims, 10 Drawing Sheets

LIGHT GUIDING MEMBER AND FINGERPRINT IDENTIFICATION MODULE HAVING THE SAME

CROSS REFERENCE TO RELATED APPLICATION

This non-provisional application claims the benefit under 35 U.S.C. § 119(e) to U.S. Provisional Application No. 63/304,435, filed on Jan. 28, 2022, which is hereby expressly incorporated by reference into the present application.

BACKGROUND OF THE INVENTION

Technical Field

The present invention relates generally to a light guiding member of a fingerprint identification module, and more particularly to a light guiding member, which could improve brightness and luminous uniformity.

Description of Related Art

It is known that fingerprint identification is a kind of biometric identification technology and mainly achieves the identification of a user's identity by identifying the unique fingerprint information on each user's finger.

Nowadays, fingerprint recognition modules have been widely used and installed on electronic devices such as mobile phones, tablet computers, or notebook computers, and users can quickly and effectively achieve fingerprint unlocking or fingerprint encryption by touching the fingerprint recognition module.

However, the user must touch a specific area (i.e., an identification area) on the electronic device to perform fingerprint identification when the fingerprint identification module is disposed on an electronic device. Therefore, how to clearly indicate the identification area of the fingerprint recognition module for users has become a major issue in the industry.

BRIEF SUMMARY OF THE INVENTION

In view of the above, the primary objective of the present invention is to provide a fingerprint identification module, which could clearly indicate an identification area of the fingerprint identification module for users.

The present invention provides a fingerprint identification module, including a light guiding member, a flexible circuit board, two light emitting members, and a fingerprint identification chip, wherein the light guiding member is made of a transparent material and includes a bottom and a protruding edge surrounding and connected to the bottom. The protruding edge surrounds to form a first space. The light guiding member has two light guiding holes communicating with the first space. A first through-hole communicating with the first space is formed on the bottom at a center or a position adjacent to the center of the bottom. The flexible circuit board is disposed in the first space, wherein at least one electrical signal transmission circuit is disposed on the flexible circuit board, and the flexible circuit board has a first portion, a second portion, a third portion, and a fourth portion connected in sequence. The first portion goes out of the light guiding member through the first through-hole. The third portion faces a direction opposite to the bottom of the light guiding member. The second portion and the fourth portion face the bottom of the light guiding member and are located between the third portion and the bottom. The two light emitting members are respectively disposed on the flexible circuit board, wherein the two light emitting members are electrically connected to the at least one electrical signal transmission circuit on the flexible circuit board and are respectively located in the two light guiding holes. The fingerprint identification chip is disposed on the third portion of the flexible circuit board and is electrically connected to the at least one electrical signal transmission circuit on the flexible circuit board.

The present invention further provides a fingerprint identification module, including a light guiding member, a flexible circuit board, a plurality of light emitting members, and a fingerprint identification chip. The light guiding member is made of a transparent material and includes a bottom and a protruding edge surrounding and connected to the bottom, wherein the protruding edge surrounds to form a first space. A first through-hole is formed on the bottom of the light guiding member. The flexible circuit board is disposed in the first space, wherein at least one electrical signal transmission circuit is disposed on the flexible circuit board, and the flexible circuit board has a first portion, a second portion, a third portion, and a fourth portion connected in sequence. The first portion goes out of the light guiding member through the first through-hole. The third portion faces a direction opposite to the bottom of the light guiding member. The second portion and the fourth portion face the bottom of the light guiding member and are located between the third portion and the bottom. The light emitting members are disposed on the flexible circuit board, wherein the light emitting members are electrically connected to the at least one electrical signal transmission circuit on the flexible circuit board and face toward the light guiding member. The fingerprint identification chip is disposed on the third portion of the flexible circuit board and is electrically connected to the at least one electrical signal transmission circuit on the flexible circuit board.

The present invention further provides a light guiding member made of a transparent material and comprising a bottom and a protruding edge surrounding and connected to the bottom, characterized in that: the protruding edge surrounds to form a first space, and a first through-hole is formed on the bottom at a center or a position adjacent to the center of the bottom; the first through-hole communicates with the first space and an outside of the light guiding member.

With the aforementioned design, the first portion of the flexible circuit board disposed in the light guiding member could go out through the first through-hole of the bottom of the light guiding member, which prevents the first portion from blocking a light path from the light emitting members to the protruding edge, thereby improving brightness and luminous uniformity to clearly indicate an identification area of the fingerprint identification module for users.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
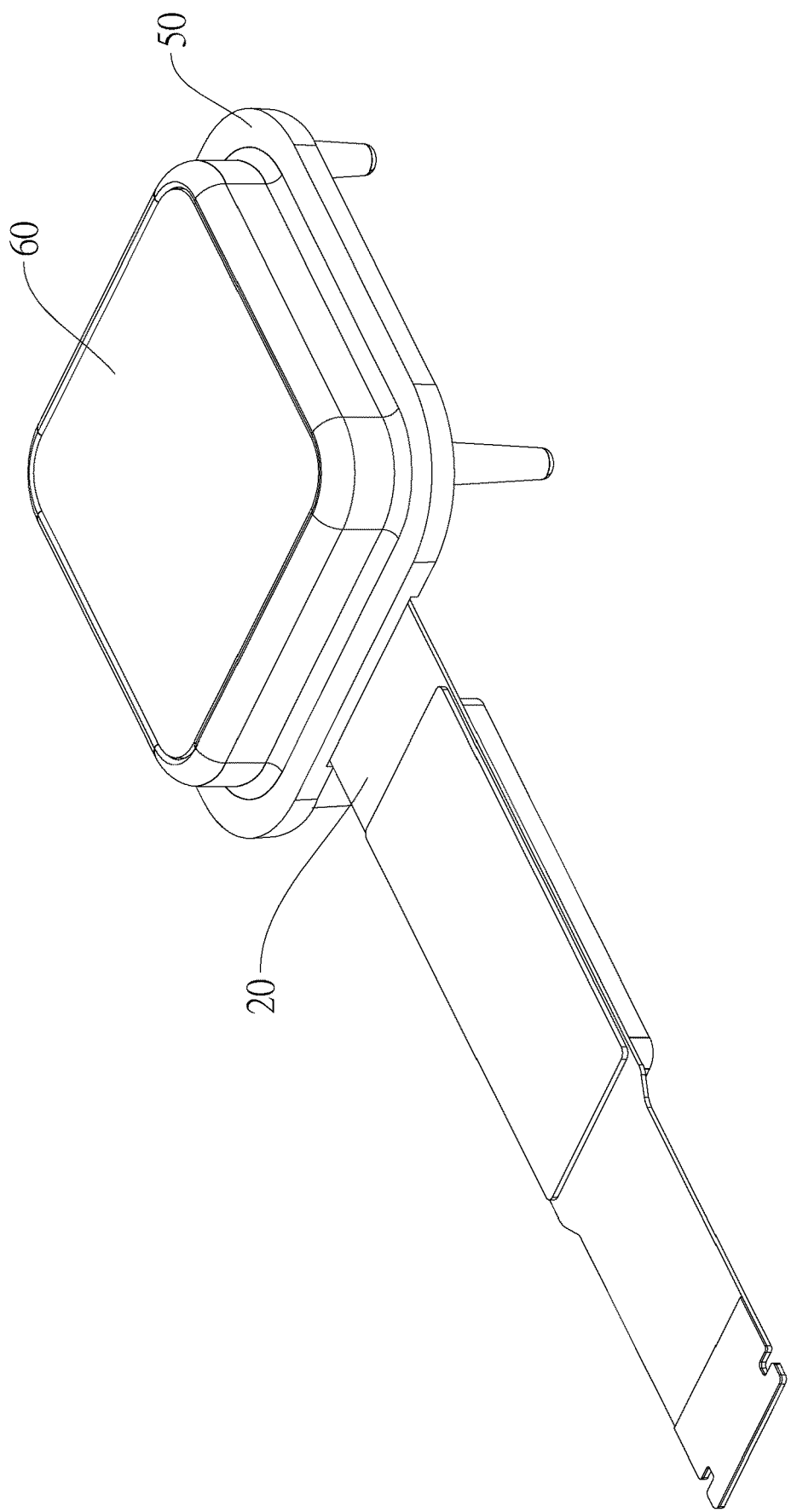
FIG. 1 is a perspective view of the fingerprint identification module according to a first embodiment of the present invention.
Figure 2:
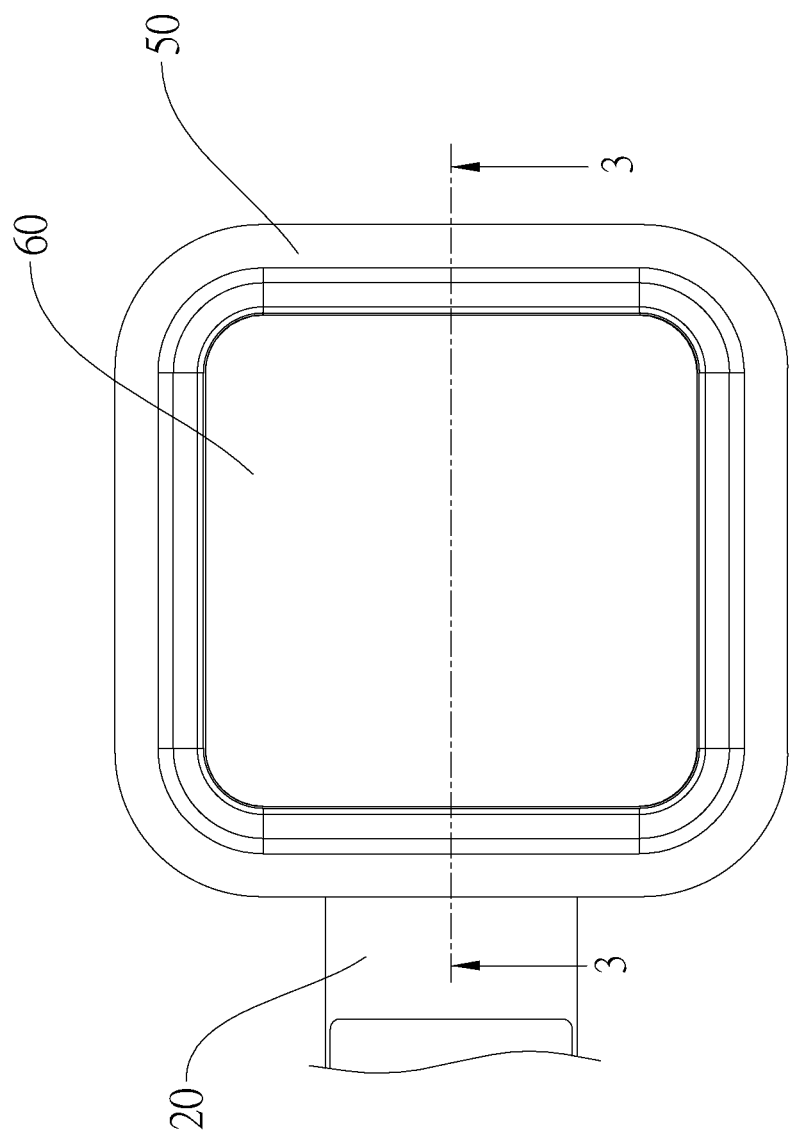
FIG. 2 is a top view of FIG. 1.

A fingerprint identification module 1 according to a first embodiment of the present invention is illustrated in FIG. 1 to FIG. 5 and includes a light guiding member 10, a flexible circuit board 20, a plurality of light emitting members 30, and a fingerprint identification chip 40, wherein the fingerprint identification chip 40 could be, for example, a capacitive sensing element which could generate an electronic signal by detecting an intensity of a charge of peaks and valleys of a user's fingerprint, thereby identifying the user's information.

Figure 5:
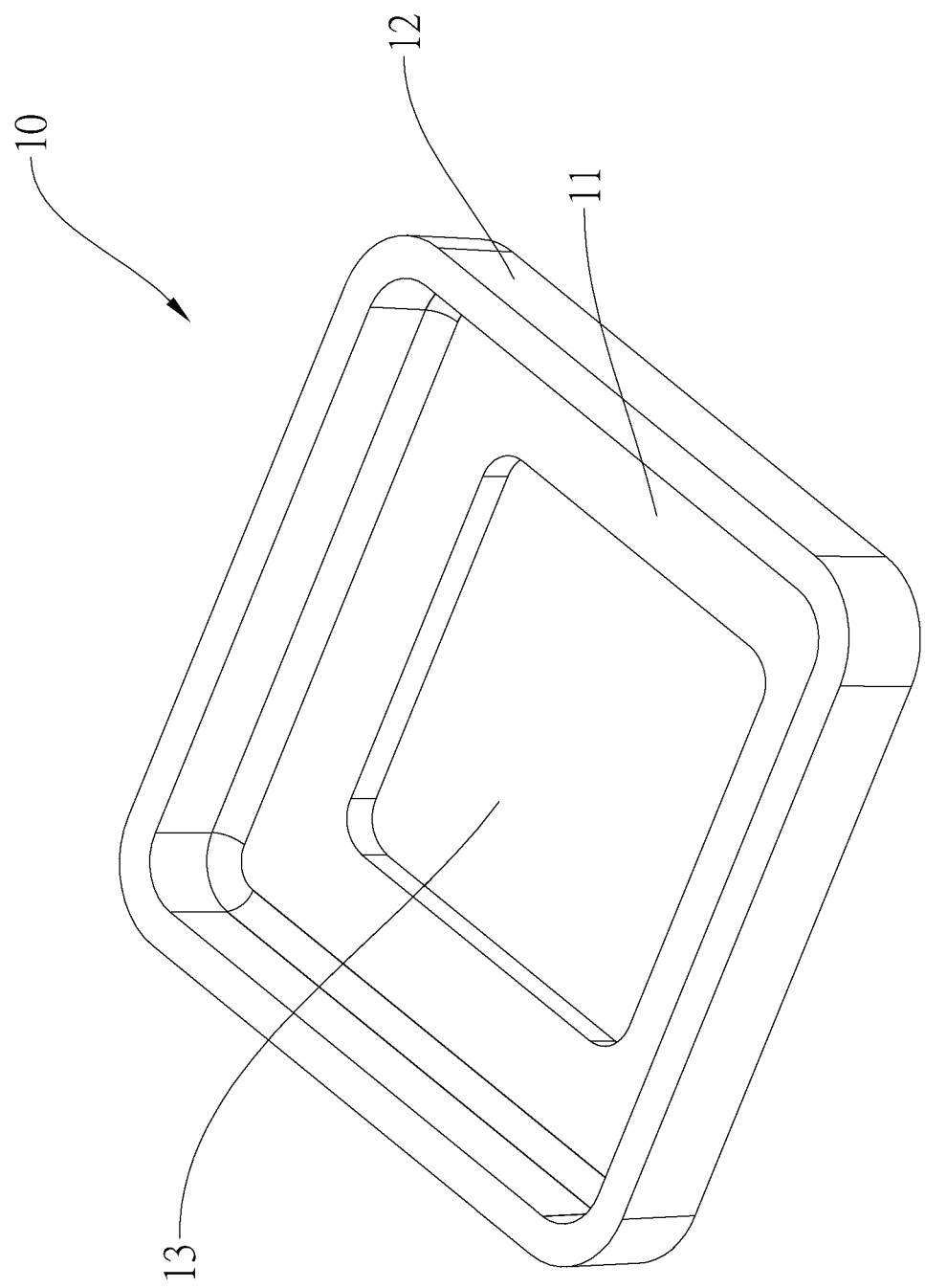
FIG. 5 is a perspective view of the light guiding member of the fingerprint identification module according to the first embodiment of the present invention.

The light guiding member 10 is made of a transparent material such as plastic. As shown in FIG. 5, the light guiding member 10 includes a bottom 11 and a protruding edge 12 surrounding and connected to the bottom 11, wherein the protruding edge 12 surrounds to form a first space 121. The light guiding member 10 has a first through-hole 13 penetrating through the bottom 11 of the light guiding member 10. In other words, the first through-hole 13 communicates with the first space 121 and an outside of the light guiding member 10.

Figure 3:
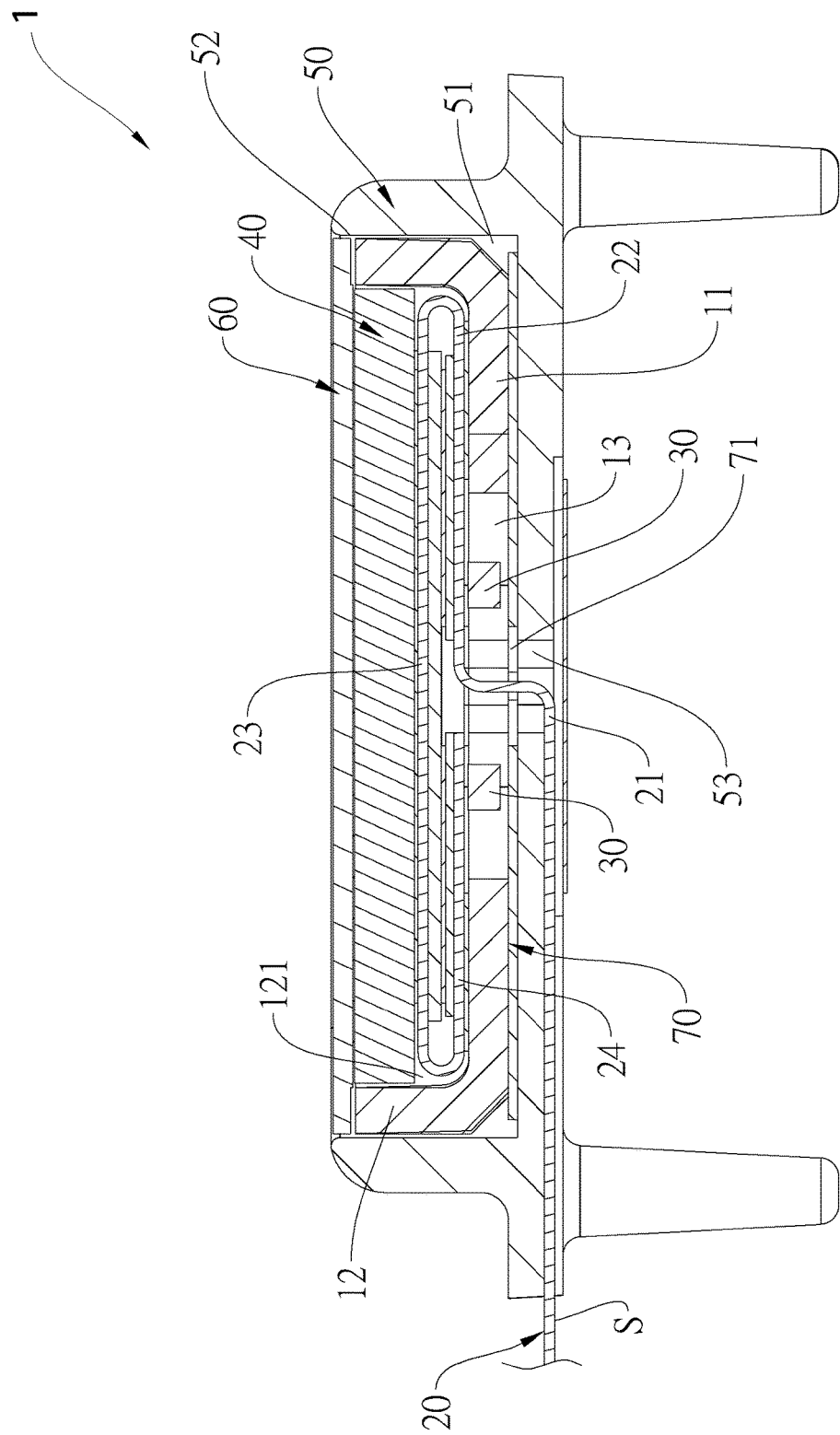
FIG. 3 is a sectional view along the 3-3 line in FIG. 2.

Referring to FIG. 3, the flexible circuit board 20 is disposed in the first space 121 and has at least one electrical signal transmission circuit, wherein the flexible circuit board 20 has a first portion 21, a second portion 22, a third portion 23, and a fourth portion 24 connected in sequence. The first portion 21 goes out of the light guiding member 10 through the first through-hole 13. The third portion 23 faces a direction opposite to the bottom 11 of the light guiding member 10. The second portion 22 and the fourth portion 24 face the bottom 11 of the light guiding member 10 and are located between the third portion 23 and the bottom 11.

The flexible circuit board 20 has a surface S, wherein the first portion 21, the second portion 22, the third portion 23, and the fourth portion 24 have the surface S in common. The first portion 21 passes through the first through-hole 13, and the second portion 22 connected to the first portion 21 extends from a side of the first through-hole 13 toward the protruding edge 12 substantially along a surface of the bottom 11, wherein the second portion 22 is disposed in a way that the surface S faces the bottom 11 of the light guiding member 10. The third portion 23 connected to the second portion 22 extends from a side of the protruding edge 12 toward an opposite side of the protruding edge 12, wherein a junction between the second portion 22 and the third portion 23 has a bend, thereby the third portion 23 is disposed in a way that the surface S faces a direction opposite to the bottom 11 of the light guiding member 10. The fourth portion 24 connected to the third portion 23 extends from the opposite side of the protruding edge 12 toward the first through-hole 13 substantially along the surface of the bottom 11, wherein a junction between the third portion 23 and the fourth portion 24 has a bend, thereby the fourth portion 24 is disposed in a way that the surface S faces the bottom 11 of the light guiding member 10.

Figure 4:
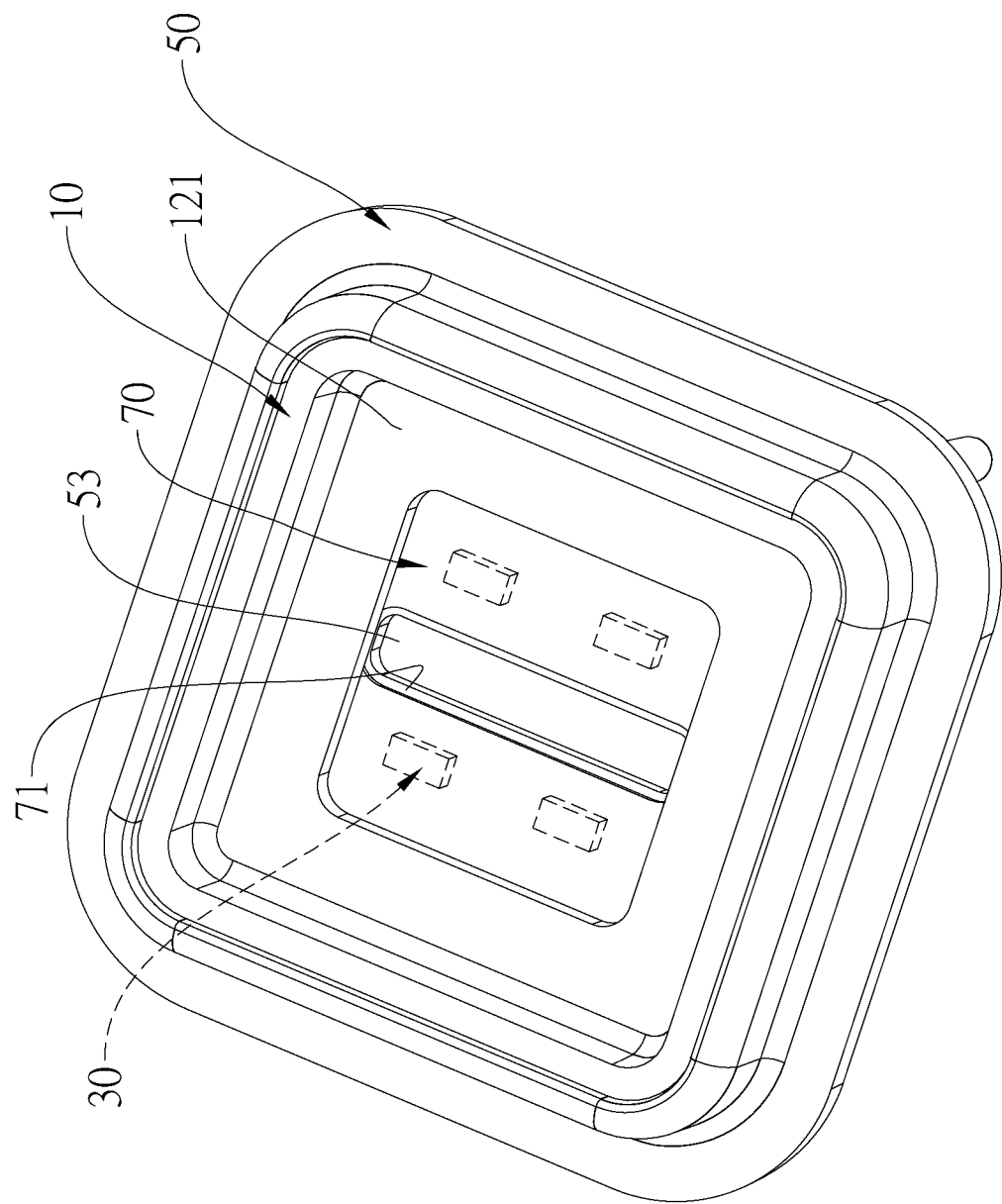
FIG. 4 is a perspective view, showing a part of the components of the fingerprint identification module according to the first embodiment of the present invention.

The light emitting members 30 are disposed on the flexible circuit board 20 and are electrically connected to the at least one electrical signal transmission circuit on the flexible circuit board 20 and face toward the light guiding member 10, wherein the light emitting members 30 could be LEDs. Referring to FIG. 3, the light emitting members 30 are respectively disposed on the surface of the second portion 22 and the fourth portion 24 of the flexible circuit board 20 and are located in the first through-hole 13. Referring to FIG. 4, in the current embodiment, the number of the light emitting members 30 is four as an example, the first through-hole 13 is a square hole as an example, and the four light emitting members 30 are respectively arranged at four corners of the first through-hole 13. In practice, the number of the light emitting members could be two or more than two, and the shape of the first through-hole could be a circle or other shapes, and each of the light emitting members could be disposed corresponding to the shape of the first through-hole.

Referring to FIG. 3, the fingerprint identification chip 40 is disposed on the surface of the third portion 23 of the flexible circuit board 20 and is electrically connected to the at least one electrical signal transmission circuit on the flexible circuit board 20.

The fingerprint identification module 1 further includes a seat 50, a glass cover 60, and a reflective member 70. The seat 50 has a second space 51, an opening 52, and a second through-hole 53, wherein the second space 51 respectively communicates with the opening 52 and the second through-hole 53. The light guiding member 10 is disposed in the second space 51, and the first through-hole 13 is located at a position corresponding to the second through-hole 53, thereby the first portion 21 of the flexible circuit board 20 could pass through the first through-hole 13 and the second through-hole 53 at the same time, wherein the fingerprint identification chip 40 is located at the opening 52, and the glass cover 60 is disposed on the seat 50 and covers the opening 52, and the fingerprint identification chip 40 is connected to the glass cover 60.

The reflective member 70 is disposed out of the light guiding member 10 and is adapted to reflect a light emitted by each of the light emitting members 30 and has a third through-hole 71 corresponding to the first through-hole 13, wherein an area of the third through-hole 71 is smaller than an area of the first through-hole 13. The first portion 21 of the flexible circuit board 20 goes out of the seat 50 by passing through the first through-hole 13, the third through-hole 71, and the second through-hole 53 in order. Referring to FIG. 4, each of the light emitting members 30 is disposed in a way facing the reflective member 70, thereby improving brightness.

Figure 6:
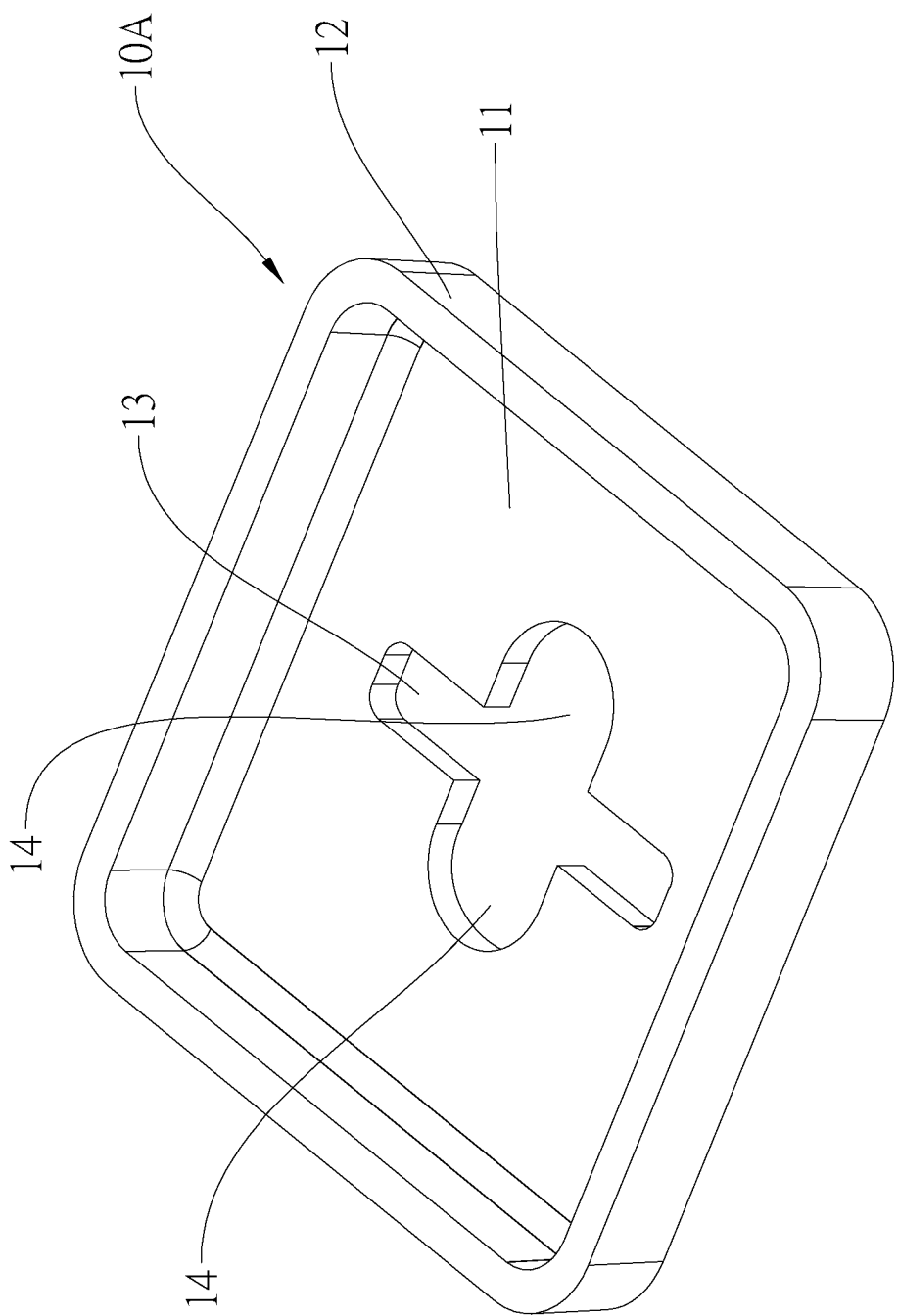
FIG. 6 is a perspective view of the light guiding member of the fingerprint identification module according to a second embodiment of the present invention.

A light guiding member 10A of a fingerprint identification module according to a second embodiment of the present invention is illustrated in FIG. 6, wherein the fingerprint identification module of the current embodiment has almost the same structure as that of the first embodiment, except that the light guiding member 10A of the current embodiment has two light guiding holes 14 communicating with the first space 121 and located on a bottom 11 of the light guiding member 10A, wherein the two light guiding holes 14 are respectively disposed on two sides of the first through-hole 13 and respectively communicate with the first through-hole 13. In the current embodiment, the number of the light emitting members 30 is two as an example, wherein the two light emitting members 30 are respectively disposed on the second portion 22 and the fourth portion 24 of the flexible circuit board 20 and are respectively located in the two light guiding holes 14, as shown in FIG. 7.

Figure 7:
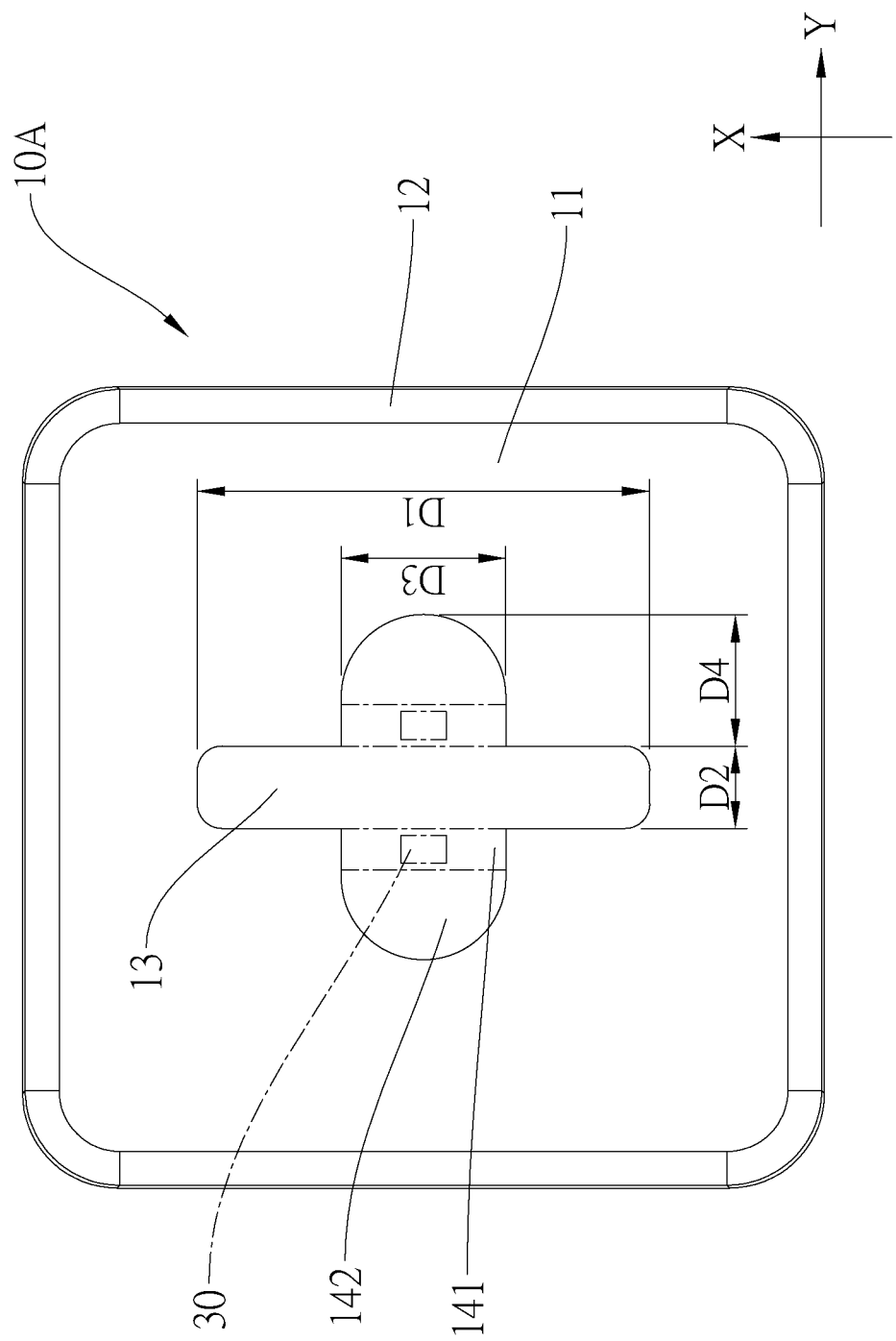
FIG. 7 is a top view of FIG. 6.

Referring to FIG. 7, each of the light guiding holes 14 has a first section 141 and a second section 142 communicating with the first section 141, wherein the first section 141 is closer to the first through-hole 13 than the second section 142, and the first section 141 is long in shape, and the second section 142 is semicircular. In this way, the light emitted by each of the light emitting members 30 could be guided to the protruding edge of the light guiding member 10 by a curved surface of the second section 142, and a distance between the second section 142 and the protruding edge 12 could be changed by adjusting a width of the first section 141, thereby improving luminous uniformity. Additionally, with the structural design of the light guiding member 10A, only two light emitting members are required to provide a uniform and bright light source, which could save manufacturing costs.

Referring to FIG. 7, a first axis X and a second axis Y perpendicular to the first axis X are defined, wherein a length D1 of the first through-hole 13 on the first axis X is greater than a length D2 of the first through-hole 13 on the second axis Y, and the length D1 of the first through-hole 13 on the first axis X is greater than a length D3 of each of the light guiding holes 14 on the first axis X, and the length D2 of the first through-hole 13 on the second axis Y is smaller than a length D4 of each of the light guiding holes 14 on the second axis Y.

Figure 8:
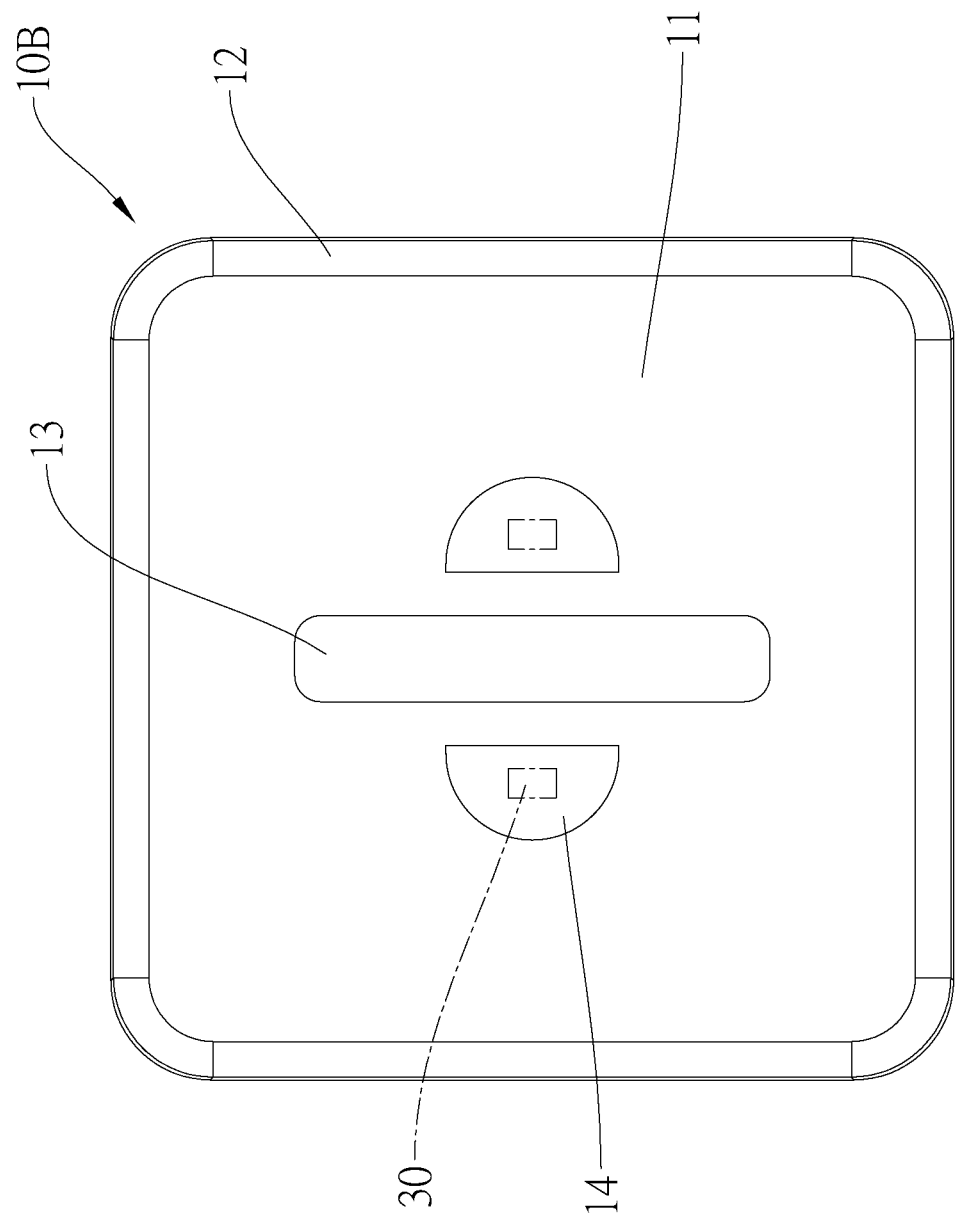
FIG. 8 is a perspective view of the light guiding member of the fingerprint identification module according to a third embodiment of the present invention.

In the current embodiment, the two light guiding holes 14 of the light guiding member 10A communicate with the first through-hole 13 as an example. Two light guiding holes 14 of a light guiding member 10B according to a third embodiment of the present invention are illustrated in FIG. 8, wherein the two light guiding holes 14 do not communicate with the first through-hole 13. Each of the two light guiding holes 14 of the light guiding member 10B is semicircular. The two light guiding holes 14 are respectively disposed on two sides of the first through-hole 13. In this way, the light emitted by each of the light emitting members 30 could be guided to a protruding edge 12 of the light guiding member 10B by a curved surface of the two light guiding holes 14.

Figure 9:
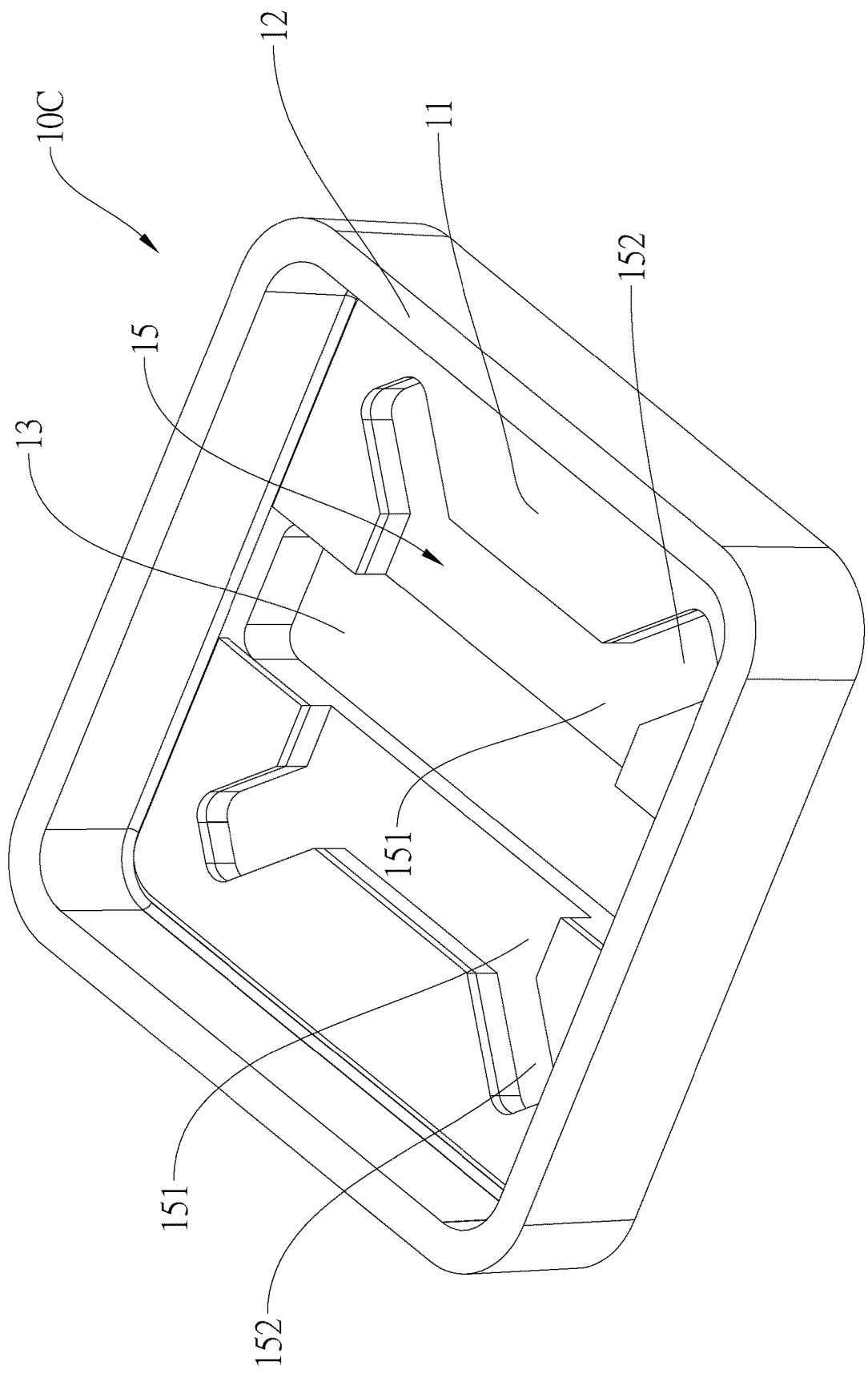
FIG. 9 is a perspective view of the light guiding member of the fingerprint identification module according to a fourth embodiment of the present invention.
Figure 10:
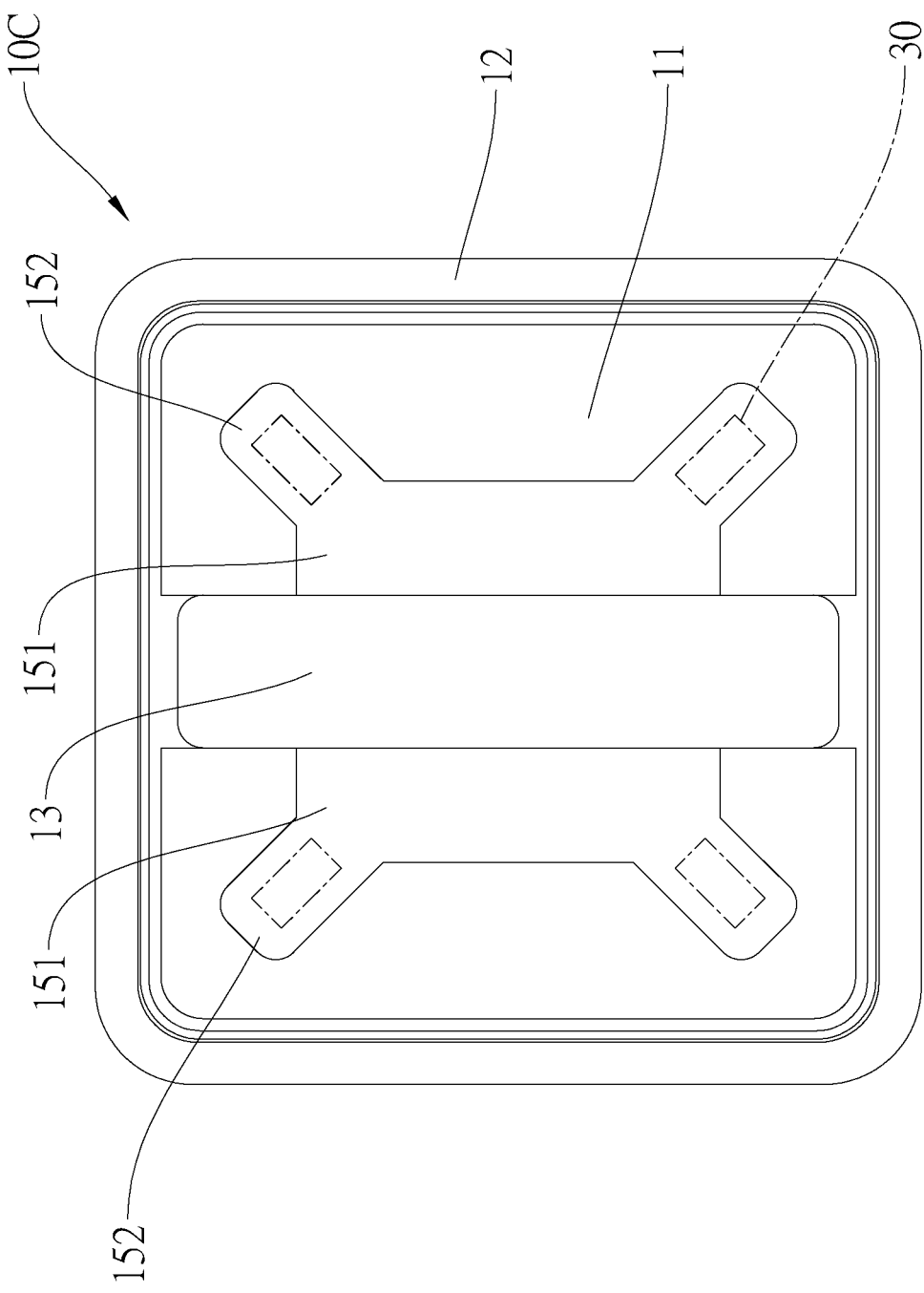
FIG. 10 is a top view of FIG. 9.

A light guiding member 10C of a fingerprint identification module according to a fourth embodiment of the present invention is illustrated in FIG. 9 and FIG. 10, wherein the fingerprint identification module of the current embodiment has almost the same structure as that of the aforementioned embodiments, except that a side of a bottom of the light guiding member 10C of the current embodiment facing the first space 121 has a light guiding recess 15 adapted to receive the light emitting members 30, wherein the light guiding recess 15 has two first recessing portions 151 and a plurality of second recessing portions 152. The two first recessing portions 151 respectively communicate with two opposite sides of the first through-hole 13. The second recessing portions 152 are located farther from the first through-hole 13 than the first recessing portions 151 and are arranged at regular intervals. The fingerprint identification module includes a plurality of light emitting members 30, and each of the second recessing portions 152 is adapted to correspondingly receive the light emitting members 30. In the current embodiment, the number of the second recessing portions 152 is four as an example. In other embodiments, the number of the second recessing portions could be two or more than two. In practice, the second recessing portion could be omitted, and the light emitting members are disposed in the first recessing portions 151.

With the aforementioned design, the first portion 21 of the flexible circuit board 20 disposed in the light guiding member 10 could go out through the first through-hole 13 of the bottom of the light guiding member 10, which prevents the first portion 21 from blocking a light path from the light emitting members 30 to the protruding edge 12, thereby improving brightness and luminous uniformity to clearly indicate an identification area of the fingerprint identification module for users.

It must be pointed out that the embodiments described above are only some preferred embodiments of the present invention. All equivalent structures which employ the concepts disclosed in this specification and the appended claims should fall within the scope of the present invention.

What is claimed is:

1. A fingerprint identification module, comprising:
a light guiding member made of a transparent material and comprising a bottom and a protruding edge surrounding and connected to the bottom, wherein the protruding edge surrounds to form a first space; a first through-hole is formed on the bottom of the light guiding member;
a flexible circuit board disposed in the first space, wherein at least one electrical signal transmission circuit is disposed on the flexible circuit board, and the flexible circuit board has a first portion, a second portion, a third portion, and a fourth portion connected in sequence; the first portion goes out of the light guiding member through the first through-hole; the third portion faces a direction opposite to the bottom of the light guiding member; the second portion and the fourth portion face the bottom of the light guiding member and are located between the third portion and the bottom;
a plurality of light emitting members disposed on the flexible circuit board, wherein the light emitting members are electrically connected to the at least one electrical signal transmission circuit on the flexible circuit board and face toward the light guiding member; and
a fingerprint identification chip disposed on the third portion of the flexible circuit board and electrically connected to the at least one electrical signal transmission circuit on the flexible circuit board.

2. The fingerprint identification module as claimed in claim 1, further comprising a seat, wherein the seat has a second space, an opening, and a second through-hole, and the second space respectively communicates with the opening and the second through-hole; the light guiding member is disposed in the second space; the first through-hole is located at a position corresponding to the second through-hole; the first portion of the flexible circuit board passes through the first through-hole and the second through-hole at the same time; the fingerprint identification chip is located at the opening.

3. The fingerprint identification module as claimed in claim 2, further comprising a glass cover disposed on the seat and covering the opening.

4. The fingerprint identification module as claimed in claim 3, wherein the fingerprint identification chip is connected to the glass cover.

5. The fingerprint identification module as claimed in claim 1, further comprising a reflective member disposed out of the light guiding member and having a third through-hole corresponding to the first through-hole, wherein the first portion of the flexible circuit board passes through the first through-hole and the third through-hole at the same time.

6. The fingerprint identification module as claimed in claim 1, wherein the light emitting members are located in the first through-hole.

7. The fingerprint identification module as claimed in claim 1, wherein the light guiding member has two light guiding holes, and the light emitting members are respectively located in the two light guiding holes.

8. The fingerprint identification module as claimed in claim 7, wherein the two light guiding holes are located on the bottom.

9. The fingerprint identification module as claimed in claim 7, wherein the two light guiding holes are respectively disposed on two opposite sides of the first through-hole.

10. The fingerprint identification module as claimed in claim 9, wherein the two light guiding holes communicate with the first through-hole.

11. The fingerprint identification module as claimed in claim 7, wherein each of the light guiding holes is semicircular.

12. The fingerprint identification module as claimed in claim 7, wherein each of the light guiding holes has a first section and a second section communicating with the first section; the first section is closer to the first through-hole than the second section and is long in shape, and the second section is semicircular.

13. The fingerprint identification module as claimed in claim 1, wherein a side of the bottom of the light guiding member facing the first space has a light guiding recess adapted to receive the light emitting members.

14. A light guiding member made of a transparent material and comprising a bottom and a protruding edge surrounding and connected to the bottom is characterized in that: the protruding edge surrounds to form a first space, and a first through-hole is formed on the bottom at a center or a position adjacent to the center of the bottom; the first through-hole communicates with the first space and an outside of the light guiding member;

wherein a side of the bottom of the light guiding member facing the first space has a light guiding recess recessed into a surface of the bottom for receiving at least one light emitting member;

wherein the light guiding recess has two first recessing portions and a plurality of second recessing portions; the two first recessing portions respectively communicate with two opposite sides of the first through-hole; the second recessing portions communicate with the first recessing portions and are located farther from the first through-hole than the first recessing portions; each of the second recessing portions is adapted to receive the at least one light emitting member.

15. The light guiding member as claimed in claim 14, wherein the bottom has two light guiding holes.

16. The light guiding member as claimed in claim 15, wherein the two light guiding holes are respectively disposed on two opposite sides of the first through-hole.

17. The light guiding member as claimed in claim 16, wherein the two light guiding holes respectively communicate with the first through-hole.

18. The light guiding member as claimed in claim 16, wherein each of the light guiding holes is semicircular.

19. The light guiding member as claimed in claim 16, wherein each of the light guiding holes has a first section and a second section communicating with the first section; the first section is closer to the first through-hole than the second section and is long in shape, and the second section is semicircular.

20. The light guiding member as claimed in claim 16, wherein a first axis and a second axis perpendicular to the first axis are defined; a length of the first through-hole on the first axis is greater than a length of the first through-hole on the second axis; the length of the first through-hole on the first axis is greater than a length of each of the light guiding holes on the first axis, and the length of the first through-hole on the second axis is smaller than a length of each of the light guiding holes on the second axis.

21. The light guiding member as claimed in claim 14, wherein the second recessing portions are arranged at regular intervals.

* * * * *